(12) United States Patent
Stineman, Jr. et al.

(10) Patent No.: US 7,230,412 B2
(45) Date of Patent: Jun. 12, 2007

(54) DISTINGUISHING NETWORK INTERFACE CARD FROM SHORT CIRCUIT CONDITION IN POWER OVER ETHERNET SYSTEM

(75) Inventors: John Arthur Stineman, Jr., Carpinteria, CA (US); Jeffrey Lynn Heath, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

(21) Appl. No.: 11/252,585

(22) Filed: Oct. 19, 2005

(65) Prior Publication Data

US 2006/0164062 A1 Jul. 27, 2006

Related U.S. Application Data

(60) Provisional application No. 60/646,509, filed on Jan. 25, 2005.

(51) Int. Cl.
*G01R 19/00* (2006.01)
*G01R 31/08* (2006.01)

(52) U.S. Cl. .................................... 324/76.11; 370/241
(58) Field of Classification Search ............. 324/76.11, 324/602, 605, 600, 606, 647, 656, 665, 672, 324/679, 705; 370/241; 709/220, 224
See application file for complete search history.

(56) References Cited

U.S. PATENT DOCUMENTS 5,179,341 A * 1/1993 Whiteside .................. 324/523

| | | | |
|---|---|---|---|
| 6,473,608 B1 * | 10/2002 | Lehr et al. ............... | 455/402 |
| 6,535,983 B1 * | 3/2003 | McCormack et al. ....... | 713/310 |
| 6,597,183 B1 * | 7/2003 | Male ........................ | 324/607 |
| 6,643,566 B1 * | 11/2003 | Lehr et al. ............... | 700/286 |
| 2002/0191553 A1 | 12/2002 | Lehr et al. | |
| 2004/0073597 A1 * | 4/2004 | Caveney et al. .......... | 709/200 |
| 2004/0260794 A1 * | 12/2004 | Ferentz et al. ........... | 709/220 |
| 2005/0041800 A1 * | 2/2005 | Lehr et al. ............... | 379/413 |
| 2005/0132240 A1 * | 6/2005 | Stineman et al. ......... | 713/300 |
| 2005/0135258 A1 * | 6/2005 | Amrod et al. ............ | 370/241 |
| 2005/0264981 A1 * | 12/2005 | Anderson et al. ........ | 361/679 |

FOREIGN PATENT DOCUMENTS

EP 1 221 783 A1 7/2002

* cited by examiner

*Primary Examiner*—Andrew H. Hirshfeld
*Assistant Examiner*—Hoai-An D. Nguyen
(74) *Attorney, Agent, or Firm*—McDermott Will & Emery LLP

(57) ABSTRACT

Novel system and methodology for distinguishing a Network Interface Card (NIC) from a short circuit condition in a Power over Ethernet (PoE) system. A system for providing power to a powered device (PD) includes a PD probing circuit that generates a detection signal supplied to a device being probed and determines a response signal produced in response to the detection signal, and a control circuit that determines a detection value based on the response signal. The control circuit detects a short circuit if the detection value is in a first predetermined range, and detects a NIC if the detection value is in a second predetermined range outside of the first predetermined range.

13 Claims, 3 Drawing Sheets

DISTINGUISHING NETWORK INTERFACE CARD FROM SHORT CIRCUIT CONDITION IN POWER OVER ETHERNET SYSTEM

This application claims priority of provisional U.S. patent application No. 60/646,509 filed on Jan. 25, 2005, and entitled "SYSTEM AND METHOD FOR SUPPORTING ADVANCED POWER OVER ETHERNET SYSTEM."

TECHNICAL FIELD

This disclosure relates to power supply systems, and more particularly, to circuitry and methodology for distinguishing the presence of a Network Interface Card (NIC) from a short circuit condition or the presence of an improper device in a Power over Ethernet (PoE) system.

BACKGROUND ART

Over the years, Ethernet has become the most commonly used method for local area networking. The IEEE 802.3 group, the originator of the Ethernet standard, has developed an extension to the standard, known as IEEE 802.3af, that defines supplying power over Ethernet cabling. The IEEE 802.3af standard defines a Power over Ethernet (PoE) system that involves delivering power over unshielded twisted-pair wiring from Power Sourcing Equipment (PSE) to a Powered Device (PD) located at opposite sides of a link. Traditionally, network devices such as IP phones, wireless LAN access points, personal computers and Web cameras, have required two connections: one to a LAN and another to a power supply system. The PoE system eliminates the need for additional outlets and wiring to supply power to network devices. Instead, power is supplied over Ethernet cabling used for data transmission.

As defined in the IEEE 802.3af standard, PSE and PD are non-data entities allowing network devices to supply and draw power using the same generic cabling as is used for data transmission. A PSE is the equipment electrically specified at the point of the physical connection to the cabling, that provides the power to a link. A PSE is typically associated with an Ethernet switch, router, hub or other network switching equipment or midspan device. A PD is a device that is either drawing power or requesting power. PDs may be associated with such devices as digital IP telephones, wireless network access points, PDA or notebook computer docking stations, cell phone chargers and HVAC thermostats.

PSE's main functions are to search the link for a PD requesting power, optionally classify the PD, supply power to the link if a PD is detected, monitor the power on the link, and disconnect power when it is no longer requested or required. A PD participates in the PD detection procedure by presenting PoE detection signature defined by the IEEE 802.3af standard. The PD detection signature has electrical characteristics measured by the PSE, such as a signature resistance in a range from 19 to 26.5 K$\Omega$.

During the PD detection procedure, the PSE produces a detection signal supplied to a device connected to the link. A response signal measured by the PSE indicates a resistance of the device being probed. If the resistance is within the range defined by the IEEE 802.3af standard, the PSE concludes that a valid PD is present.

If the resistance is below the IEEE 802.3af acceptable range, the detection signature may indicate that an improper device is plugged in. In addition, a very low resistance detected during the PD detection procedure may indicate a short circuit condition, or the presence of a Network Interface Card (NIC) connected to the link. A typical NIC impedance is 150$\Omega$. Hence, present PSE's are not able to determine whether a NIC is detected, a short circuit condition exists, or an improper device having a low resistance is plugged in based on a PD response signal measured during the PD detection procedure.

While the presence of a NIC is considered to be a normal condition, it would be desirable to inform a user when an improper device is plugged in or a short circuit condition is detected. Therefore, there is a need for a PD detection scheme that would enable the PSE to distinguish the presence of a NIC from a short circuit condition and the presence of an improper device.

SUMMARY OF THE DISCLOSURE

The present disclosure offers novel system and methodology for distinguishing a Network Interface Card (NIC) from a short circuit condition in a Power over Ethernet (PoE) system. In accordance with one aspect of the disclosure, a system for providing power to a powered device (PD) includes a PD probing circuit that generates a detection signal supplied to a device being probed and determines a response signal produced in response to the detection signal, and a control circuit that determines a detection value based on the response signal. The control circuit detects a short circuit if the detection value is in a first predetermined range, and detects a NIC if the detection value is in a second predetermined range outside of the first predetermined range.

In accordance with a further aspect of the disclosure, the control circuit determines that an improper PD is detected if the detection value is in a third predetermined range outside of the first and second predetermined ranges.

In accordance with another aspect of the disclosure, the control circuit controls the PD probing circuit to increase a value of the detection signal if the response signal does not exceed a threshold value.

In accordance with an embodiment of the disclosure, the detection value includes a detection resistance value indicating a resistance of the device being probed. A short circuit is detected if the detection resistance value is less than a first predetermined resistance. A NIC is detected if the detection resistance value is in a range between the first predetermined resistance and a second predetermined resistance higher than the first predetermined resistance. An improper PD is detected if the detection resistance value exceeds the second predetermined resistance.

For example, a Power Sourcing Equipment (PSE) in a PoE system may comprise a probing circuit that generates a first detection current supplied to a device being probed and determines a first response voltage produced in response to the first detection current. If the first response voltage is less than a threshold value, the probing circuit generates a second detection current larger than the first detection current and determines a second response voltage produced in response to the first detection current. Based on a difference between the second response voltage and the first response voltage, the detection circuit may determine a detection resistance value indicating a resistance of the device being probed.

In accordance with a method of the present disclosure, the following steps are carried out to detect a PD in a PoE system:

producing a first detection signal supplied to a device being probed to determine a first response signal, and producing a second detection signal larger than the first detection signal if the first response signal is less than a threshold value.

The method further involves the step of determining a detection resistance value defined by a difference between a second response signal produced in response to the second detection signal, and the first response signal.

A short circuit condition is detected if the detection resistance value is less than a first predetermined resistance. A NIC is detected if the detection resistance value is in a range between the first predetermined resistance and a second predetermined resistance higher than the first predetermined resistance. Finally, an improper PD is detected if the resistance detection value exceeds the second predetermined resistance.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made with the example of detecting a powered device (PD) in a Power over Ethernet (PoE) system. It will become apparent, however, that the concepts described herein are applicable to recognizing any device connected to a power supply link in a power supply system.

Figure 1:
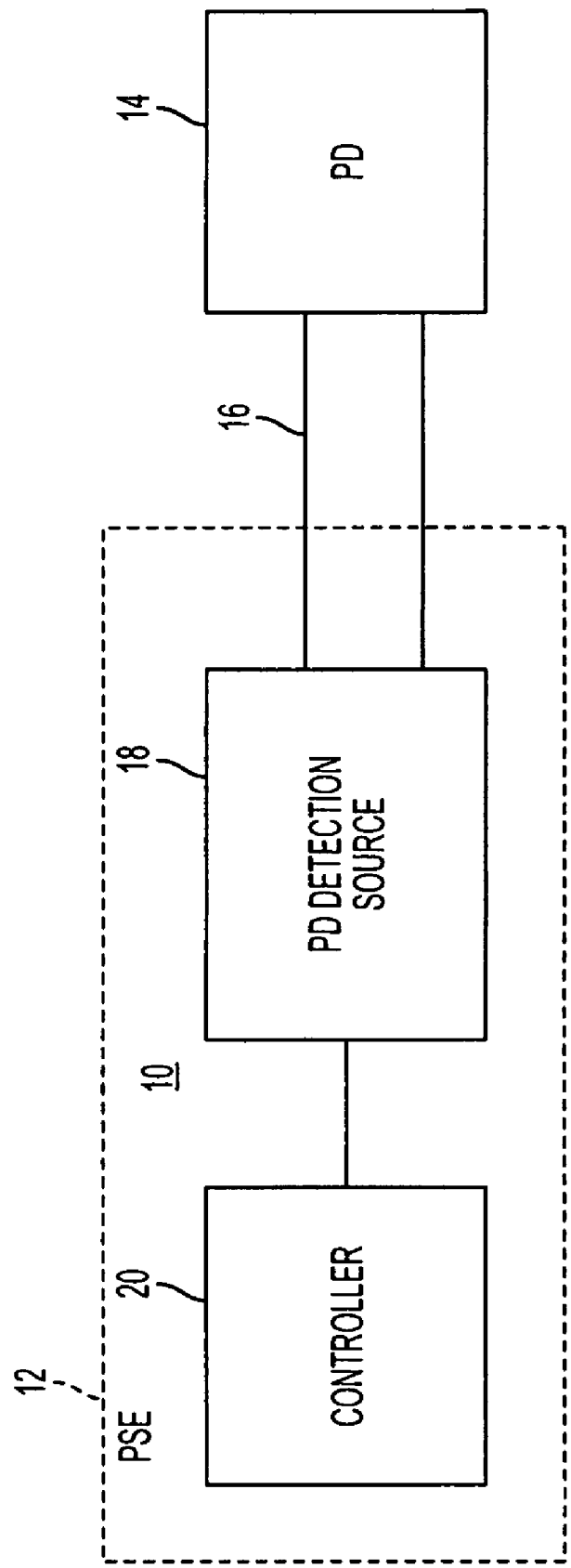
FIG. 1 is a block diagram illustrating an exemplary system for detecting a powered device (PD) in accordance with the present disclosure.

FIG. 1 shows a simplified block-diagram of a PD detection system 10 of the present disclosure in a PoE system comprising a PSE 12, and a PD 14 connectable to the PSE 12 via a link 16, such as a 2-pair link defined in the IEEE 802.3af standard. The PD detection system 10 includes a detection source 18 and a controller 20 that may be arranged in the PSE 12.

The detection source 18 may be a force-current detection source that produces detection current Idet for probing a device connected to the link 16, such as the PD 14. Thereafter, the detection source 18 determines voltage Vres produced in response to the detection current Idet supplied to the device being probed. The controller 20 may be a state machine or a microcontroller arranged in the PSE 12.

Figure 2:
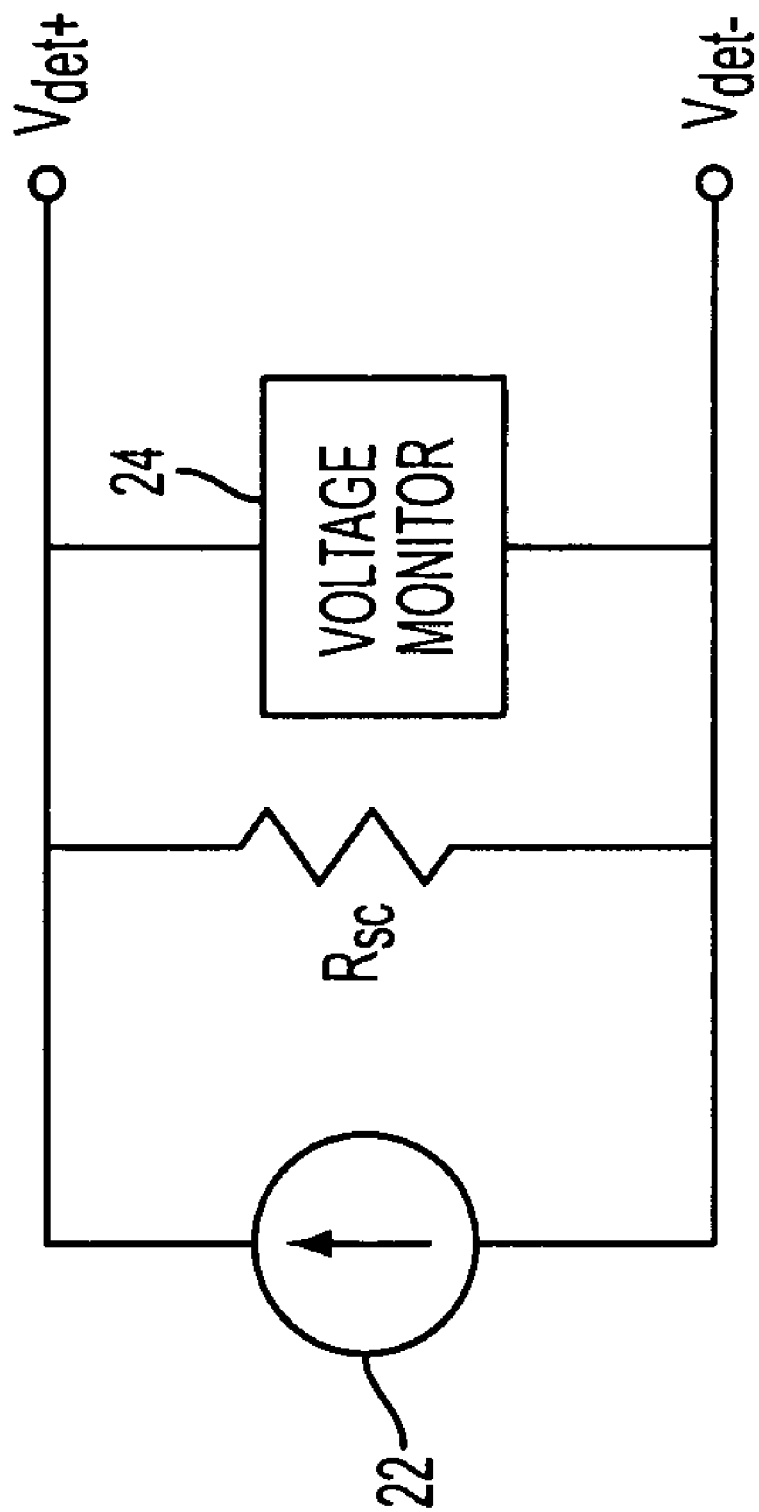
FIG. 2 is a Norton equivalent circuit of a detection source.

FIG. 2 shows a Norton equivalent circuit of the detection source 18 that comprises a current source 22, source resistance Rsc connected in parallel to the current source 22, and a voltage monitor 24 connected in parallel to the source resistance Rsc.

In each test for detecting a powered device, the detection source 18 produces detection current Idet that may correspond to detection voltage Vdet in the voltage range from 2.8V to 10V defined in the IEEE 802.3af standard. The source resistance Rsc may be in the range from 100 KOhm to 100 MOhm. The minimum current difference between values of the detection current Idet produced for different detection tests corresponds to a Vdet voltage difference of 1V.

The voltage monitor 24 determines voltage Vres produced in response to the detection current Idet supplied to a device being probed. The detection resistance Rdet of this device is determined as Rdet=ΔVres/ΔIdet, where ΔIdet is a difference between detection currents in different tests, and ΔVres is a difference between voltages produced in response to the respective detection currents.

If the detection resistance is within the range defined by the IEEE 802.3af standard, the PSE 12 concludes that a valid PD is connected to the link 16. However, if the detection resistance is below the IEEE 802.3af acceptable range, the PSE 12 may not be able to determine whether a Network Interface Card (NIC) is present, a short circuit is detected, or an improper device having a low resistance is plugged in.

Figure 3:
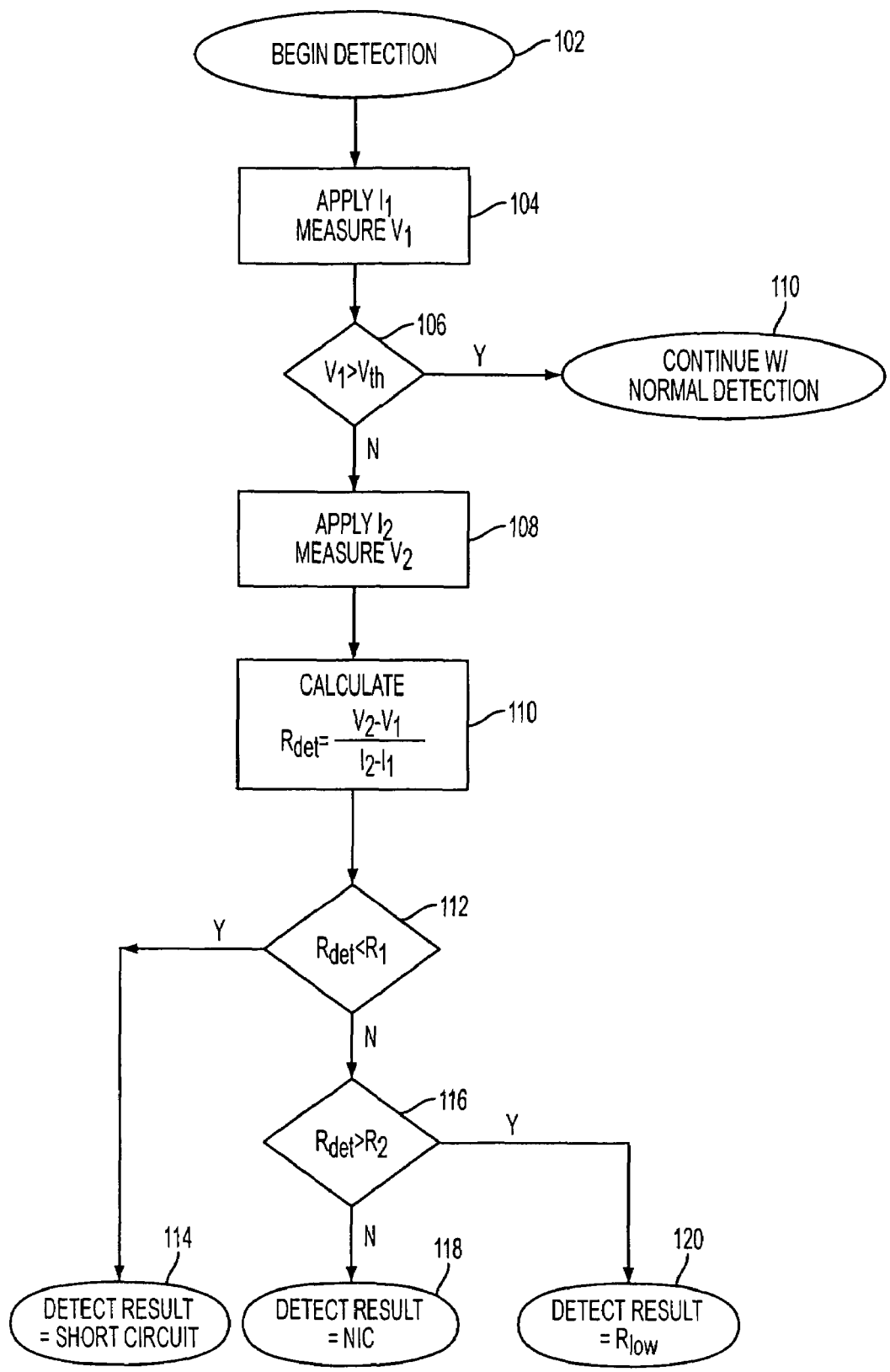
FIG. 3 is a flow chart illustrating a control algorithm for controlling operations of the system for detecting the presence of a NIC, a short circuit condition, or an improper powered device.

While the presence of a NIC is considered to be a normal condition, a user may need to be informed when an improper device is plugged in or a short circuit is detected. FIG. 3 is a flow chart illustrating a control algorithm carried out by the controller 24 to enable the PD detection system 10 to detect the presence of a NIC, a short circuit condition, or an improper device.

After a PD detection procedure is initiated (step 102), the controller 20 requests the detection source 18 to generate detection current $I_1$. For example, the 240 μA current may be produced. After a predetermined waiting period equal for example to 160 ms, the detection source 18 is controlled to enable the voltage monitor 24 to measure voltage $V_1$ developed in response to the current $I_1$ supplied to a device being probed (step 104).

Then, the controller 20 compares the measured voltage $V_1$ with predetermined threshold voltage $V_{th}$ (step 106). For example, the threshold voltage $V_{th}$ may be equal to 0.8V. The voltage $V_1$ below the threshold voltage $V_{th}$ indicates that the device being probed may have a very low resistance, or that a short circuit is detected. Therefore, if the voltage $V_1$ does not exceed the threshold voltage $V_{th}$, the controller 20 instructs the detection source 18 to generate detection current $I_2$ larger than the detection current $I_1$ in order to perform a detection procedure with better resolution (step 108). For example, the detection current $I_2$ may be equal to 240 μA. If the voltage $V_1$ exceeds the threshold voltage $V_{th}$, the controller 20 controls the detection source 18 to perform a regular PD detection procedure. For example, the detection source 18 may carry out a PD detection procedure defined by the IEEE 802.3af standard.

After generating the detection current $I_2$, the detection source 18 measures response voltage $V_2$ produced in response to the detection current $I_2$ supplied to the device being probed. If this device is a NIC, a larger current $I_2$ used for the second measurement causes the voltage difference created by the NIC to be large enough to distinguish the NIC from a short circuit.

Then, in step 112, the controller 20 calculates detection resistance Rdet of the device being probed as follows:

$$Rdet=(V_2-V_1)/(I_2-I_1).$$

In step 112, the calculated detection resistance Rdet is compared with a first predetermined resistance value $R_1$ selected to indicate a short circuit condition. For example, first predetermined resistance value $R_1$ may be equal to 100Ω. If the detection resistance Rdet is less than the first predetermined resistance $R_1$, the controller 20 concludes that a short circuit is detected (step 114).

If the detection resistance Rdet is not less than the first predetermined resistance $R_1$, the calculated detection resistance Rdet is compared with a second predetermined resistance value $R_2$ selected to distinguish a NIC from an improper powered device with a low resistance (step 116). For example, the second predetermined resistance value $R_2$ may be equal to 300Ω.

If the detection resistance Rdet does not exceed the predetermined resistance value $R_2$, the controller 20 concludes that a NIC is detected (step 118). However, if the detection resistance Rdet exceeds the predetermined resistance value $R_2$, the controller 20 determines that the device being probed is an improper device with a low resistance (step 120).

The PSE 12 may include an indication device to provide a user with information on a detected condition. As a NIC connected to the Ethernet link is considered to be a normal condition, the user may be informed only when a short circuit is detected or an improper power device is plugged in.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. For example, instead of operating in a force-current mode, the detection source of the present disclosure may operate in a force-voltage mode to generate a detection voltage supplied to a device being probed and measure a response current produced in response to the generated detection voltage.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A system for providing power to a powered device (PD) in a Power over Ethernet (PoE) system, comprising:
    a PD probing circuit for determining first and second response signals produced in response to respective first and second detection signals supplied over an Ethernet link to a device being probed, and
    a control circuit, configured for:
    controlling the PD probing circuit to supply over the Ethernet link the second detection signal greater than the first detection signal if the first response signal does not exceed a threshold value, and
    determining that a short circuit condition is detected if a detection value defined by a difference between the second response signal and the first response signal is in a first predetermined range, and determining that a Network Interface Card connected to the Ethernet link is detected if the detection value is in a second predetermined range outside of the first predetermined range.

2. The system of claim 1, wherein the control circuit is configured for determining that an improper device is detected if the detection value is in a third predetermined range outside of the first and second predetermined ranges.

3. The system of claim 1, wherein the detection value includes a detection resistance value indicating a resistance of the device being probed.

4. The system of claim 3, wherein the control circuit is configured to determine that the short circuit condition is detected if the detection resistance value is less than a first predetermined resistance.

5. The system of claim 4, wherein the control circuit is configured to determine that the Network Interface Card is detected if the detection resistance value is in a range between the first predetermined resistance and a second predetermined resistance higher than the first predetermined resistance.

6. The system of claim 5, wherein the control circuit is configured to determine that an improper device is detected if the detection resistance value exceeds the second predetermined resistance.

7. A Power Sourcing Equipment (PSE) in a Power over Ethernet (PoE) system, comprising:
    a probing circuit for determining a first response voltage produced in response to a first detection current supplied over an Ethernet link to a device being probed, and for determining a second response voltage produced in response to a second detection current supplied over the Ethernet link if the first response voltage is less that a threshold value, the second detection current being greater than the first detection current, and
    a detection circuit responsive to the probing circuit to determine a detection resistance value indicating a resistance of the device being probed, the detection resistance value being defined by a difference between the second response voltage and the first response voltage,
    the detection circuit being configured for determining that a short circuit condition is detected if the detection resistance value is in a first predetermined range, and determining that a Network Interface Card connected to the Ethernet link is detected if the resistance detection value is in a second predetermined range outside of the first predetermined range.

8. The PSE of claim 7, wherein the detection circuit is configured for determining that an improper device is detected if the detection resistance value is in a third predetermined range outside of the first and second predetermined ranges.

9. The PSE of claim 7, wherein the detection circuit is configured to determine that a short circuit condition is detected if the detection resistance value is less than a first predetermined resistance.

10. The PSE of claim 9, wherein the detection circuit is configured to determine that the Network Interface Card is detected if the detection resistance value is in a range between the first predetermined resistance and a second predetermined resistance higher than the first predetermined resistance.

11. The PSE of claim 10, wherein the detection circuit is configured to determine that the improper device is detected if the resistance detection value exceeds the second predetermined resistance.

12. A method of detecting a powered device (PD) in a Power over Ethernet (PoE) system, comprising the steps of:
producing a first detection signal supplied to a device being probed to determine a first response signal,
producing a second detection signal larger than the first detection signal if the first response signal is less than a threshold value,
determining a detection resistance value defined by a difference between a second response signal produced in response to the second detection signal, and the first response signal,
detecting a short circuit condition if the detection resistance value is less than a first predetermined resistance,
detecting a Network Interface Card if the detection resistance value is in a range between the first predetermined resistance and a second predetermined resistance higher than the first predetermined resistance; and
indicating a result of detection.

13. The method of claim 12, further comprising the step of detecting an improper device if the resistance detection value exceeds the second predetermined resistance.

* * * * *